United States Patent
Sasaki et al.

(10) Patent No.: US 10,457,565 B2
(45) Date of Patent: *Oct. 29, 2019

(54) PRODUCTION METHOD FOR HEMATITE FOR IRON PRODUCTION

(71) Applicant: Sumitomo Metal Mining Co., Ltd., Tokyo (JP)

(72) Inventors: Hideki Sasaki, Minato-ku (JP); Hiroyuki Mitsui, Minato-ku (JP); Yasumasa Kan, Minato-ku (JP)

(73) Assignee: Sumitomo Metal Mining Co., Ltd. (JP)

( * ) Notice: Subject to any disclaimer, the term of this patent is extended or adjusted under 35 U.S.C. 154(b) by 49 days.

This patent is subject to a terminal disclaimer.

(21) Appl. No.: 15/724,624

(22) Filed: Oct. 4, 2017

(65) Prior Publication Data

US 2018/0037470 A1 Feb. 8, 2018

Related U.S. Application Data

(63) Continuation-in-part of application No. 14/386,222, filed on Sep. 18, 2014, now abandoned.

(51) Int. Cl.
 *C22B 3/22* (2006.01)
 *C01G 49/06* (2006.01)
 *C22B 3/00* (2006.01)

(52) U.S. Cl.
 CPC .............. *C01G 49/06* (2013.01); *C22B 3/22* (2013.01); *C22B 23/043* (2013.01); *C01P 2006/80* (2013.01); *Y02P 10/212* (2015.11)

(58) Field of Classification Search
 None
 See application file for complete search history.

(56) References Cited

U.S. PATENT DOCUMENTS

| 2,719,082 | A | 9/1955 | Etienne |
| 2,796,340 | A | 6/1957 | Cyr et al. |
| 2,867,506 | A | 1/1959 | Roberts |
| 3,042,498 | A | 7/1962 | Charles |
| 3,093,559 | A | 6/1963 | White |

(Continued)

FOREIGN PATENT DOCUMENTS

| CA | 2678724 | 3/2010 |
| CN | 1858273 | 11/2006 |

(Continued)

OTHER PUBLICATIONS

International Search Report dated Apr. 9, 2013.

(Continued)

*Primary Examiner* — Melissa S Swain
(74) *Attorney, Agent, or Firm* — Gerald E. Hespos; Michael J. Porco; Matthew T. Hespos

(57) ABSTRACT

Provided is a production method for refining iron oxide (hematite), which has such a low sulfur content as to be used as a raw material for ironmaking from a leach residue containing iron oxide, the leach residue being produced by a high pressure acid leach (HPAL) process and being a raw material that can be cheaply and stably procured. In the method of producing (high purity) hematite for ironmaking by a process of adding an oxidant and sulfuric acid to nickel oxide ore and then leaching nickel, a leach residue obtained after the leaching of nickel is heated to 600° C. or more, and preferably 800° C. or more and 1400° C. or less.

5 Claims, 2 Drawing Sheets

(56) References Cited

U.S. PATENT DOCUMENTS

| | | | |
|---|---|---|---|
| 3,232,744 | A | 2/1966 | Munekata et al. |
| 3,655,364 | A | 4/1972 | Evans et al. |
| 3,671,197 | A | 6/1972 | Mascio |
| 3,854,931 | A | 12/1974 | Gorling |
| 3,957,484 | A | 5/1976 | Fekete |
| 4,069,041 | A | 1/1978 | Gorling |
| 4,572,822 | A | 2/1986 | Abe |
| 6,428,604 | B1 | 8/2002 | Kerfoot et al. |
| 8,052,774 | B2 | 11/2011 | Nagase |
| 2005/0265910 | A1 | 12/2005 | Kobayashi et al. |
| 2006/0133974 | A1 | 6/2006 | Ji |
| 2007/0295613 | A1 | 12/2007 | Moyes et al. |
| 2009/0148366 | A1 | 6/2009 | Roche et al. |
| 2010/0031777 | A1 | 2/2010 | Akiyama et al. |

FOREIGN PATENT DOCUMENTS

| | | |
|---|---|---|
| CN | 101230422 | 7/2008 |
| CN | 101338376 | 1/2009 |
| CN | 101392321 | 3/2009 |
| CN | 101886272 | 11/2010 |
| CN | 102041381 | 5/2011 |
| JP | 4816811 | 3/1973 |
| JP | 3176081 | 7/1991 |
| JP | 2001-032002 | 2/2001 |
| JP | 2004509232 | 3/2004 |
| JP | 2005350766 | 12/2005 |
| JP | 200777459 | 3/2007 |
| JP | 2007530778 | 11/2007 |
| JP | 2008530356 | 8/2008 |
| JP | 2009520661 | 5/2009 |
| JP | 2010-95788 | 4/2010 |
| WO | 2007071020 | 6/2007 |
| WO | 2008032634 | 3/2008 |

OTHER PUBLICATIONS

Chinese Patent Appl. No. 201380015130.6—Office Action dated Jun. 3, 2015.
Australian Patent Appl. No. 2013236727—Office Action dated Oct. 26, 2015.
McDonald, R.G., et al. Atmospheric Acid Leaching of Nickel Laterites review Part I. Sulphuric Acid Technologies, Hydrometallugy, vol. 91, 2008, pp. 35-55.

PRODUCTION METHOD FOR HEMATITE FOR IRON PRODUCTION

CROSS-REFERENCE TO RELATED APPLICATIONS

This disclosure claims the benefit of priority to U.S. patent application Ser. No. 14/386,222, filed Sep. 18, 2014, claiming priority to PCT/JP2013/050671, filed Jan. 16, 2013, which claims priority to JP 2012-062794, filed Mar. 19, 2012, the disclosures of which are incorporated herein in their entirety.

FIELD OF THE INVENTION

The present invention relates to a production method for refining a leach residue obtained by hydrometallurgical refining of nickel oxide ore into hematite that can be used as an iron-making raw material and has low-grade sulfur.

BACKGROUND

In steel smelting, a method of charging iron ore containing iron oxide into a blast furnace along with a reductant such as coke, heating and melting the iron ore under a reducing atmosphere to obtain crude steel, and refining the crude steel in a converter to obtain desired steel has been used.

The iron oxide that is a raw material of the steel is a limited resource, and furthermore it is gradually hard to obtain high-quality iron ore required to maintain a quality of steel.

Meanwhile, with respect to nickel becoming a raw material of stainless steel, technology for smelting low-grade oxide ore as a raw material due to a tendency toward resource exhaustion of sulfide ore that has been used in the past has been developed and put to practical use.

To be specific, nickel oxide ore such as limonite or saprolite is put into a pressure device such as an autoclave along with a sulfuric acid, and nickel is leached under high pressure and high temperature of about 240 to 260° C.

The nickel leached into a solution of the sulfuric acid is used as nickel metal or a nickel salt compound by adding a neutralizer to neutralize a surplus acid, separating a leach residue by solid-liquid separation, separating impurities to recover the leach residue as an intermediate raw material in the form of hydroxide or sulfide, and further refining the intermediate raw material.

In such a process called high pressure acid leach (HPAL), nickel can be almost completely leached even from low-grade ore in which valuable metals intended for recovery are contained by not more than 1% to 2% by weight (hereinafter indicated by "%" with regard to a grade). Further, the HPAL process has a feature of concentrating the valuable metals up to the same grade as a conventional raw material by producing an intermediate raw material from a leachate, and refining the nickel in a process similar to a conventional process.

Further, the HPAL process may be applied to various types of ores such as nickel sulfide ore, copper sulfide ore, and copper oxide ore, in addition to the nickel oxide ore.

Further, a main component of the leach residue obtained by the HPAL process is iron oxide having the form of hematite. This is secondarily obtained because each of oxide ore and sulfide ore of nickel or copper used as a raw material contains iron of an amount far more than a content of nickel or copper.

These leach residues are created at a high temperature, and thus have the form of oxide that is chemically or environmentally stable. However, the leach residues have no special utility value, and have been scrapped to a residue disposal yard. For this reason, it has been a grave challenge how to secure the disposal yards for an enormous amount of leach residues generated along with the smelting.

Furthermore, the leach residue of the HPAL process cannot be directly used for the aforementioned iron-making raw material. The reason is that the leach residue of the HPAL process contains gangue and impurities, particularly sulfur, in addition to the iron oxide and requires exhaust gas treatment, and thus is not suitable for the raw material used in the conventional iron-making process in common.

Particularly, a grade of sulfur in iron oxide usable for the iron-making raw material differs depending on facility capacity and an amount of production of individual iron-works, and generally needs to be suppressed to less than 1%.

The sulfur is hardly contained in the original nickel oxide ore. Nevertheless, the sulfur contained in the leach residue by about 1 to 3% results from calcium sulfate (plaster) generated by reaction of sulfuric acid and limestone or slaked lime added as the neutralizer in order to neutralize free sulfuric acid remaining at the leach slurry.

Therefore, it is considered that what creates a soluble salt may be used as the added neutralizer, not the slaked lime or what forms insoluble sediment, such as the slaked lime, after the neutralization.

For example, the neutralizer suitable for such application includes sodium hydroxide, potassium hydroxide, magnesium hydroxide, and magnesium oxide.

However, these neutralizers are expensive, and have a limited amount of production. Thus, when a large quantity of neutralizer is required as in the HPAL process, it is industrially difficult to cover the whole quantity.

For this reason, there has been no choice but to use a calcium-based neutralizer in whole or in part which forms the insoluble sediment after the neutralization as described above, and thereby mixing of the sulfur has been inevitable. As such, it has been impossible to process the leach residue created in the HPAL process into the hematite and to use it as the iron-making raw material.

On the other hand, a method of separating sulfur in jarosite using a pressure device such as an autoclave is also known.

For example, JP H03-176081 A discloses a method that includes stirring a jarosite-containing residual and a zinc sulfide inclusion in an autoclave at least under oxygen partial pressure of 1000 kPa at a temperature of 130 to 170° C. along with a free sulfuric acid of 40 to 100 g/l, substantially dissolving iron and zinc fractions of a concentrate containing the residual and zinc sulfide, introducing the solution into a leach circulation passage for zinc electrolysis to settle iron in the form of hematite, and separating sulfur from the above solid, and supplying the residual for separate application.

However, this method requires an expensive device such as an autoclave, increases a facility cost, and further has a problem even in the aspect of productivity.

The invention is intended to provide a production method for refining hematite, which has such a low sulfur component as to be used as an iron-making raw material, from a leach residue containing iron oxide produced by a high pressure acid leach (HPAL) process.

SUMMARY

To solve the above problems, a first aspect of the present invention provides a method for producing (high purity)

hematite for ironmaking by a process of adding an oxidant and sulfuric acid to nickel oxide ore and then leaching nickel. The method further includes heating a leach residue, which is obtained after the nickel is leached, to 600° C. or more.

A second aspect of the present invention provides a method for producing (high purity) hematite for ironmaking by a process of adding an oxidant and sulfuric acid to nickel oxide ore and then leaching nickel. The method further includes heating a leach residue, which is obtained after the nickel is leached, to 800° C. or more and 1400° C. or less.

The present invention can bring about several industrially significant effects.

First, is possible to easily obtain hematite that has low-grade sulfur and can be used as an iron-making raw material.

Second, a raw material that can be cheaply and stably procured is used. Thus, hematite with the low-grade sulfur can be obtained inexpensively.

Third, wastes, such as a leach residue, discharged in a refining process can be applied to the iron-making raw materials, and it is thus possible to remarkably reduce an amount of the scrapped leach residue and further reduce production costs by lowering an environmental risk, reducing scrapping costs, and reducing construction costs of a leach residue disposal yard; and Fourth, when hematite with the low-grade sulfur is produced, a special facility is not required, and thus establishment of its producing process is easy.

BRIEF DESCRIPTION OF THE FIGURES

For a more complete understanding of the disclosure, reference should be made to the following detailed description and accompanying drawing figures wherein.

While specific embodiments are illustrated in the figures, with the understanding that the disclosure is intended to be illustrative, these embodiments are not intended to limit the invention described and illustrated herein.

DETAILED DESCRIPTION

The present invention is to heat a leach residue obtained when a mineral, such as nickel oxide ore, containing valuable metals and iron is subjected to high-pressure sulfuric acid leach, to separate sulfur, and to produce high-purity hematite that can be used as an iron-making raw material having a low sulfur content.

Figure 1:
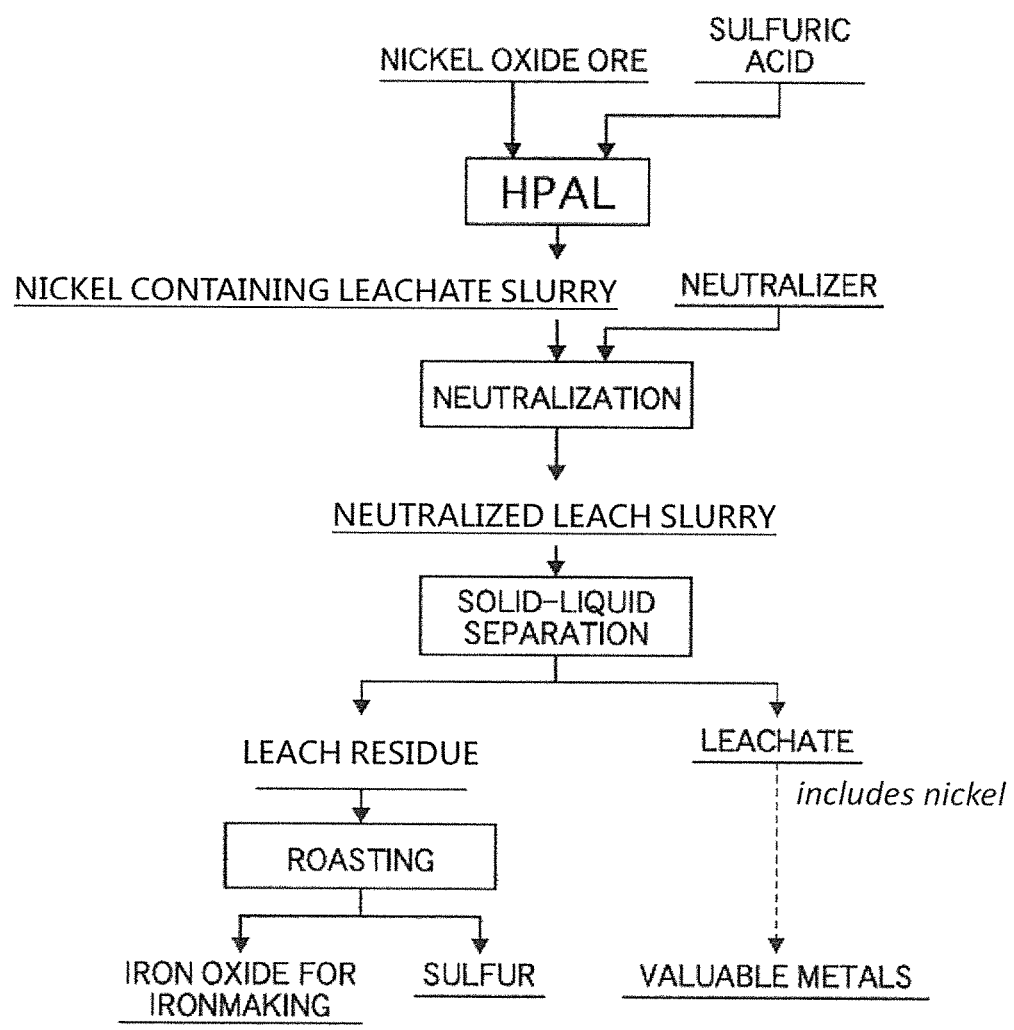
FIG. 1 is a flow chart showing a recovery process of performing high-pressure sulfuric acid leach on a mineral containing valuable metals and iron to recover the valuable metals, and further showing a refining process of hematite having low-grade sulfur which is associated with the recovery process.

FIG. 1 illustrates a flow for a recovery process of performing high-pressure sulfuric acid leach on a mineral, such as nickel oxide ore, containing valuable metals and iron to recover the valuable metals and a further flow for a refining process of a production method according to the present invention of producing hematite having low-grade sulfur from a leach residue obtained in association with the recovery process.

The flow for the recovery process of the valuable metals is indicated by an outline arrow, and the flow for the refining process of the hematite according to the invention is indicated by a black arrow.

Refining Process of Hematite

A leach residue to be a starting raw material of the present process is obtained as sediment from a neutralized leach slurry, which is generated by neutralizing a nickel containing leachate slurry obtained in the event of high-pressure sulfuric acid leach (HPAL) as illustrated in FIG. 1, subjected to solid-liquid separation. As such, the leach residue is formed in a state in which a reaction product of a neutralizer input in the neutralization process and a surplus acid is contained. Accordingly, limestone or slaked lime added as the neutralizer and sulfuric acid are reacted to neutralize a free sulfuric acid remaining in the nickel containing leachate slurry. Thereby, the leach residue contains sulfur resulting from created calcium sulfate (plaster) by several percentage (%).

Heating of Leach Residue

Therefore, as a method of separating a sulfur component from such a leach residue containing several percentage of sulfur, the leach residue is heated on given conditions. That is, as illustrated in FIG. 1, the iron oxide (hematite) for ironmaking which has low-grade sulfur is refined by roasting the leach residue and evaporating the sulfur component.

Figure 2:
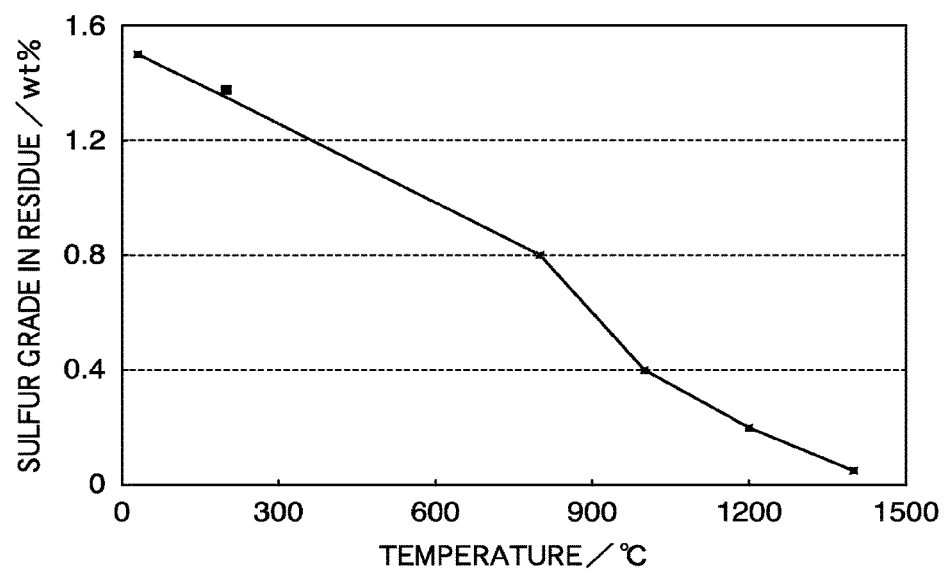
FIG. 2 is a diagram illustrating a relation between a heating temperature and a grade of sulfur in a leach residue.

FIG. 2 illustrates a relation between a heating temperature and the sulfur grade in the leach residue.

A temperature at which the leach residue is heated is 600° C. or more, preferably 800° C. or more, which is an effective temperature in order to make the sulfur grade in the iron oxide for iron making less than 1%. Further, when the heating temperature exceeds 800° C., the sulfur grade is sharply reduced, which is more preferable. When the heating temperature becomes 1300° C., the sulfur grade can be reduced up to 0.1% or less, which is more preferable, but when the heating temperature more preferably exceeds 1400° C., this gives no great difference, and is not very preferable in the aspect of facility investment such as an increase in heating energy or a need for heat resistance of a furnace wall material. Accordingly, the heating temperature is 600° C. or more and 1400° C. or less, and preferably 800° C. or more and 1300° C. or less.

A heating time is affected by a furnace size and an amount of the residue, and thus may be adequately adjusted. Further, the heating is performed in an oxidizing atmosphere such as atmospheric air. Thereby, along with the heating, the sulfur is removed from the leach residue as sulfur dioxide, and the high-purity iron oxide (hematite) is formed.

EXAMPLES

Hereinafter, the invention will be described using examples.

Example 1

Nickel oxide ore having 1% nickel grade and 46 to 48% iron grade was adjusted to be a slurry of 30 to 40% by weight, and then was mixed with sulfuric acid of 64% by weight. Subsequently, the slurry was charged into a pressure device, heated to 240 to 250° C., and maintained for one hour, and a nickel containing leachate slurry was obtained by leaching nickel in the ore (HPAL).

After the leaching, the nickel containing leachate slurry was cooled to about 70° C., and then slaked lime was added to neutralize a surplus acid (neutralization) forming a neutralized leach slurry. The neutralized leach slurry was subjected to solid-liquid separation using Nutsche and a filtering bottle, and was separated into the leachate and the leach residue (solid-liquid separation).

In the leach residue, an iron grade was 49.9%, and a sulfur grade was 1.5%.

Next, the leach residue was equally divided into six parts, which were respectively raised to 30° C., 200° C., 800° C., 1000° C., 1200° C., and 1400° C., heated for one hour, and cooled.

The sulfur grade of the leach residues after the cooling were analyzed, and the analyzed results were illustrated in FIG. 2.

As illustrated in FIG. 2, it is found that the sulfur grade is reduced up to about 1% at about 600° C., and that, when the temperature exceeds 800° C., the sulfur grade is sharply reduced, and the sulfur can be effectively separated.

In Table 1, results of measuring the iron and sulfur grades in the neutralized residue after the heating are illustrated. The iron and sulfur grades were measured by fluorescent X-ray analysis.

TABLE 1

| | Sample | Sulfur grade [% by weight] |
|---|---|---|
| Supply | Neutralized residue | 1.5 |
| Heating | 800° C. | 0.8 |
| | 1000° C. | 0.4 |
| | 1200° C. | 0.2 |

With this use of the invention, it is possible to separate the sulfur from the HPAL leach residue, and to refine the hematite so as to be usable as the raw material for ironmaking.

What is claimed is:

1. A method of producing hematite for ironmaking comprising:
   mixing sulfuric acid and nickel oxide ore to form a slurry;
   heating the slurry in a pressure vessel at a temperature of 240° C. to 250° C. wherein nickel is leached from the ore, thereby forming a nickel containing leachate slurry;
   adding a neutralizer to the leachate slurry thereby neutralizing any sulfuric acid and forming a neutralized leachate slurry, wherein a reaction of the neutralizer and the sulfuric acid yields a calcium sulfate; and then
   separating the neutralized leachate slurry into a leach residue and a leachate, where the leach residue includes iron oxide and calcium sulfate, and where the leachate includes nickel; and then
   heating the leach residue that includes iron oxide and calcium sulfate to 600° C. or more and thereby providing hematite having a sulfur grade of less than 1%.

2. The method of claim 1, wherein the leach residue is heated to a temperature of 800° C. to 1400° C.

3. The method of claim 2, wherein the hematite has a sulfur grade of 0.8% to 0.1%.

4. The method of claim 2 further comprising heating the leach residue in an oxidizing atmosphere and removing sulfur from the leach residue as sulfur dioxide.

5. The method of claim 1, wherein the neutralizer is a limestone or slaked lime.

* * * * *